United States Patent
Ismert

[11] 3,905,357
[45] Sept. 16, 1975

[54] CUSHION MAINTAINING DEVICE FOR WATER SERVICE LINES

[76] Inventor: Theodore J. Ismert, 4000 Main St., Grandview, Mo. 64030

[22] Filed: May 13, 1974

[21] Appl. No.: 469,237

[52] U.S. Cl. ................................................ 138/26
[51] Int. Cl.² ........................................ F16L 55/04
[58] Field of Search ...................................... 138/26

[56] References Cited
UNITED STATES PATENTS

| | | | |
|---|---|---|---|
| 2,081,799 | 5/1937 | Doran | 138/26 |
| 2,100,404 | 11/1937 | Mason et al. | 138/26 |
| 2,290,788 | 7/1942 | Wilson | 138/26 |

FOREIGN PATENTS OR APPLICATIONS

| | | | |
|---|---|---|---|
| 405,582 | 2/1934 | United Kingdom | 138/26 |
| 158,616 | 11/1932 | Switzerland | 138/26 |
| 133,968 | 2/1933 | Germany | 138/26 |
| 628,668 | 4/1936 | Germany | 138/26 |
| 650,337 | 9/1937 | Germany | 138/26 |
| 556,123 | 8/1932 | Germany | 138/26 |

Primary Examiner—Richard E. Aegerter
Assistant Examiner—Richard R. Stearns
Attorney, Agent, or Firm—Fishburn, Gold & Litman

[57] ABSTRACT

A cushion maintaining device for use with a water service line is operative to automatically maintain a gas cushion in a chamber within a body member mounted on and extending upwardly from the water service line and positioned adjacent a valve, faucet, or the like to absorb shock caused by sudden closing of the valve or faucet. The cushion maintaining device includes a positive electrode and a negative electrode positioned in spaced apart relation within the body member mounted on the water service line and electrically connected to a source of electrical current. Electrical components are connected in the circuit to the electrodes to convert current thereto to pulsating direct current to thereby convert water in contact with the electrodes to gas which maintains a gas cushion within the body member.

10 Claims, 4 Drawing Figures

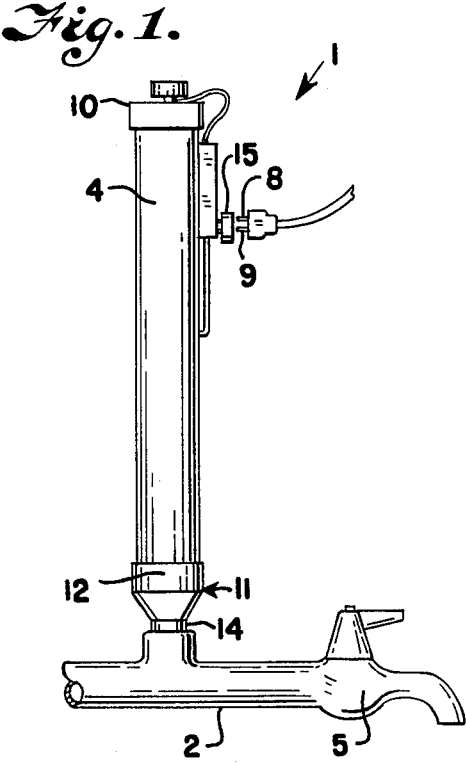
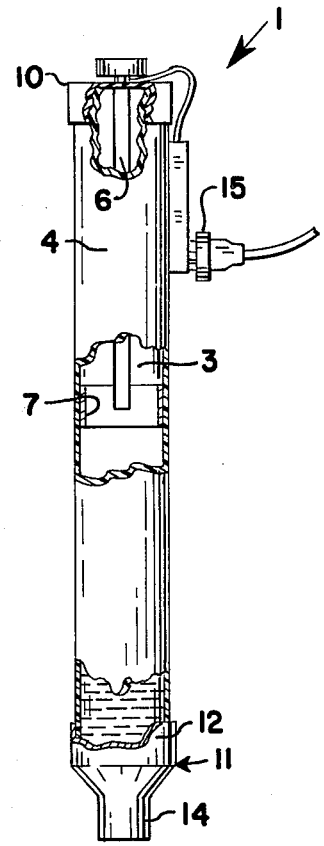
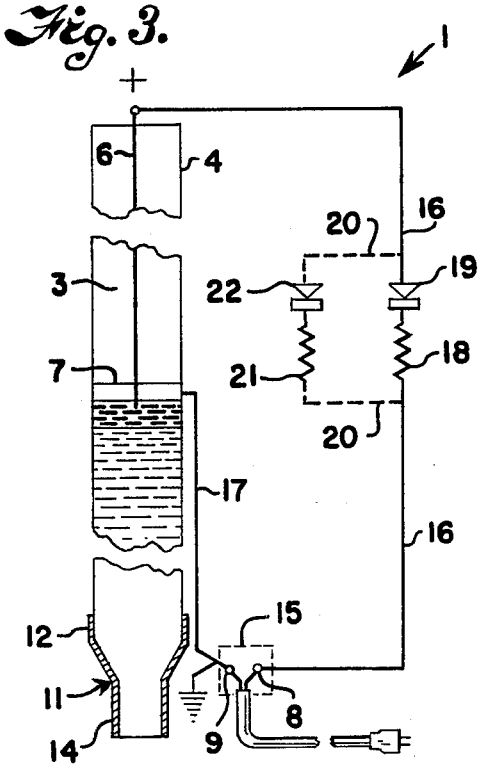
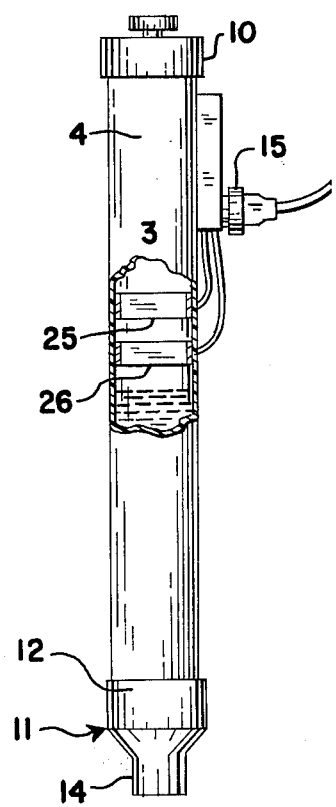

CUSHION MAINTAINING DEVICE FOR WATER SERVICE LINES

The present invention relates to air chambers for water service lines and more particularly to cushion maintaining device operative to automatically maintain a gas cushion in a chamber within a body member mounted on and extending upwardly from a generally horizontal portion of a water service line.

The principal objects of the present invention are: to provide a gas cushion maintaining device for use with a generally horizontal water service line and which is operative to automatically maintain a gas cushion in a chamber within a body member mounted on and extending upwardly from the water service line and positioned adjacent a valve, faucet, or the like to absorb shock caused by sudden closing of the valve or faucet; to provide such a cushion maintaining device which is substantially service or maintenance free; to provide such a cushion maintaining device which is adapted for operation on water service lines over a wide range of water pressures; to provide such a cushion maintaining device which automatically turns on when water within the chamber reaches a selected upper level and automatically turns off when the water is converted to gas and the pressure within the chamber is such to force the surface of the water below a selected lower level; to provide such a cushion maintaining device which uses a minimum of electrical current and then only when water in the chamber rises above a selected upper level; and to provide such a cushion maintaining device which is economical to manufacture, durable in construction, positive in operation, safe for residential and commercial use, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include exemplary embodiments of the present invention and illustrate various objects and features of the air cushion maintaining device.

FIG. 1 is a side elevational view of a residential water service line having mounted thereon a cushion maintaining device embodying features of the present invention.

FIG. 2 is an enlarged side elevational view of the cushion maintaining device with portions broken away to better show the component parts thereof.

FIG. 3 is a wiring diagram of a circuit operative to electrically convert water to gas.

FIG. 4 is an enlarged side elevational view of an other form of the cushion maintaining device with portions broken away to better show the component parts thereof.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a cushion maintaining device for use with a generally horizontal portion 2 of a water service line. The cushion maintaining device 1 is operative to automatically maintain a gas cushion in a chamber 3 within a body member 4 mounted on and extending upwardly from the water service line portion 2, said device 1 being positioned adjacent a valve, such as a faucet 5 or the like, to absorb caused by sudden closing of the valve or faucet 5. The cushion maintaining device 1 includes a positive electrode 6 and a negative electrode 7 positioned in spaced apart relation within the body member 4 and a positive terminal 8 and a negative terminal 9 of a source of electrical current are electrically connected to the positive electrode 6 and to the negative electrode 7 respectively and define a portion of a circuit completed by water in engagement with the electrodes 6 and 7. Electrical components are connected to the electrical circuit and to one of the terminals of the current source, for example, the positive terminal 8, and to the respective electrode, for example the positive electrode 6, to convert current thereto to pulsating direct current to thereby convert water in contact with the positive and negative electrodes 6 and 7 to gas which maintains a gas cushion within the body member 4.

In the illustrated structure the body member 4 is elongate and may be any desired cross-sectional shape, such as cylindrical, and the body member 4 is tubular to thereby define the chamber 3 therein. The upper end of the body member is closed, as by a cap 10 mounted on the top or upper end of the body member 4 and suitably sealed thereon in a manner to be permanently gas tight and to retain high pressure gas therein, as by gaskets, epoxy, welding, solder, or the like.

The body member 4 has a side wall formed of a material which is substantially inert to water, oxygen gas, and hydrogen gas. Stainless steel, glass, and certain plastics have been found to be adapted to resist water service pressures and be inert to water, oxygen gas, and hydrogen gas.

The body member 4 has a lower end thereof mounted on and extending upwardly from the water service line 2 and providing communication between the water service line 2 and the chamber 3. In the illustrated structure, a tubular base or connection member 11 formed of a material which is a non-conductor of electricity has an upper portion 12 adapted to receive therein a lower end of the body member 4. The base or connection member 11 has a intermediate portion tapering from the upper portion 12 to a lower portion 14 which is adapted to be mounted on the water service line 2. The lower end of the body member 4 is suitably sealed in the upper portion 12 of the base or connection member 11 and the lower portion 14 of the base or connection member 11 is suitably sealed on the water service line 2, as by epoxy, solder, welding, or the like, to thereby provide a fluid and gas tight connection between the body member 4 and the water service line 2.

The positive electrode 6 is positioned within the body member 4 and depends from the cap 10 at the closed upper end of the body member 4. The positive electrode 6 is illustrated as being substantially coaxial with the body member 4. The positive electrode 6 preferably is substantially inert to water, oxygen, gas, and hydrogen gas so that the electrode has a long life. Gold, platinum, MONEL metal and stainless steel are substantially inert to water, air, oxygen gas and hydrogen gas to provide the long life desired. The positive electrode 6 has a lower end positioned intermediate the ends of the body member 4 and in spaced relation with the negative electrode 7.

The negative electrode 7 is formed as an electrically conductive portion of the side wall of the body member 4 and is formed in a band on an interior surface of the body member 4 and of a material which is good conductor of electricity yet is substantially inert to air, water, oxygen gas and hydrogen gas. One form of electrode is a band of suitable material, such as platinum, gold or MONEL metal formed or positioned on the interior surface of the body member 4 intermediate the ends of the body member 4 and surrounding and spaced from the lower end of the positive electrode 6.

Means are mounted on the body member 4 to provide an operating circuit when completed by water and the circuit connects the positive terminal 8 and the negative terminal 9 of a source of electrical current to the positive electrode 6 and to the negative electrode 7 respectively. In the illustrated structure, a suitable electrical receptacle 15 is mounted on the body member 4 and is adapted to receive the terminals 8 and 9. An electrical conductor 16 extends between the positive terminal 8 and the positive electrode 6. The electrical conductor 16 extends through the cap 10 and is electrically connected to an upper end of the positive electrode 6. The electrical conductor 16 is suitably sealed in the cap 10, as by epoxy or the like, whereby the cap 10 remains gas and fluid tight. An electrical conductor 17 extends between the negative terminal 9 and the negative electrode 7. The conductor 17 extends through the side wall of the body member 4 and is suitably electrically connected to the band forming the negative electrode 7, as by having the plate deposited over the end thereof.

Means are electrically connected to one of the terminals of the source of electrical current and to the respective electrode to convert to said electrode to pulsating direct current to thereby convert water in contact with the positive and negative electrodes 6 and 7 to oxygen gas and hydrogen gas. In the illustrated embodiment, the electrical conductor 16 extending between the positive terminal 8 and the positive electrode 6 has a suitable electrical resistor 18 therein. The electrical resistor 18 is operative to limit the amount of current drawn by the system and also to prevent damage to a diode 19 mounted in the electrical conductor 16 and positioned between the electrical resistor 18 and the positive electrode 6.

It is desirable to provide a parallel means to convert current to the positive electrode 6 to pulsating direct current so that the parallel means will be operative in the event of failure of the diode 19. In the illustrated embodiment, an electrical conductor 20 has one end electrically connected to the electrical conductor 16 at a position between the electrical receptacle 15 and the electrical resistor 18 in the electrical conductor 16. The other end of the electrical conductor 20 is electrically connected to the electrical conductor 16 at a position between the positive electrode 6 and the diode 19 thereby forming a loop around the resistor 18 and the diode 19.

The electrical conductor 20 has a suitable electrical resistor 21 mounted therein and positioned intermediate the ends of the electrical conductor 20. The resistor 21 serves the same function as the resistor 18 and is operative to limit the amount of current drawn by the system and also to prevent damage to a diode 22 in the electrical conductor 20 and positioned between the resistor 21 and the connection of the conductor 20 to the electrical conductor 16 between the positive electrode 6 and the diode 19.

Operation of a gas cushion maintaining device 1 constructed as illustrated and described is automatic and as the water from the water service line 2 rises into the body member 4 by absorbing air or gas in the chamber 3 an electrical current is generated in the cushion maintaining device 1 when the water engages both the positive electrode 6 and the negative electrode 7 whereby the pulsating direct current flows between the positive electrode 6 and the negative electrode 7 and through the water within the chamber 3 to thereby convert the water to oxygen gas and hydrogen gas by electrolysis. The process continues until the oxygen gas and hydrogen gas within the chamber 3 reach a pressure sufficient to move the upper surface of the water toward the water service line 2 and out of contact with the positive electrode 6 and the negative electrode 7 thereby electrically turning off the device 1. The cushion maintaining device 1 will remain inoperative as long as the surface of the water is below the positive electrode 6 and the negative electrode 7 whereby the electrical circuit will not be completed until water again engages both electrodes 6 and 7.

FIG. 4 illustrates an other form of the cushion maintaining device wherein the body member, cap, and base or connection member are substantially as illustrated in FIGS. 1 to 3 inclusive, except that a positive electrode 25 is formed as a band on an interior surface of a side wall of the body member. As before, platinum, gold, and MONEL metal have been found effective to provide a substantially inert material which is electrically conductive. A negative electrode 26 is also formed as a band on thee interior surface of the body member and is positioned in vertically spaced relation from the band defining the positive electrode 25.

Operation of the form illustrated in FIG. 4 is substantially similar to operation of the cushion maintaining device 1 illustrated in FIGS. 1 to 3 inclusive except that water in contact with the negative electrode 26 alone will not start operation of the device. The water must also be in contact with the positive electrode 25. The operation is substantially similar in that production of oxygen gas and hydrogen gas by electrolysis will continue until the surface of the water in the chamber is lowered below the positive electrode 25. Operation will not resume until the oxygen gas and hydrogen gas have been absorbed by the water thereby permitting the water to again come in contact with the positive electrode 25 thereby completing the electrical circuit between the electrodes and the source of electrical current.

It is to be understood that while I have illustrated and described certain forms of my invention, it is not to be limited to these specific forms or arrangement of parts herein described and shown.

What I claim and desire to secure by Letters Patent is:

1. A cushion maintaining device for water service lines, said device comprising:

a. body walls defining a chamber having a closed upper end and a lower end mounted on a water service line with communication between said chamber and the water service line whereby water under pressure will enter the lower portion of said chamber and rise to a level compressing trapped gas thereabove to a pressure equalling the water pressure;

b. means within said body chamber defining first and second electrodes positioned in spaced apart relation and for contact with water in said chamber when the water rises to a predetermined level therein;

c. means defining an electric circuit connecting said first and second electrodes to a source of electrical current with the water in the chamber completing the circuit when contacting said electrodes and interrupting the circuit when the water level is lowered below at least one of said electrodes; and d. means responsive to the completed electric circuit for converting a portion of the water contained in the body chamber into gases under pressure above the water level until the accummulation of gases causes the water level to lower below the predetermined level thereby interrupting the electric circuit.

2. A cushion maintaining device as set forth in claim 1 wherein:

a. the source of electrical current has a first terminal and a second terminal b. said first terminal is connected to said first electrode and said second terminal is connected to said second electrode; and c. said means for converting a portion of the water in said body chamber to gases under pressure comprises means in the electric circuit and electrically connected to one of said terminals of the source of electrical current and to the respective one of said first and second electrodes to convert current to said one electrode to pulsating direct current to thereby convert water in said body chamber and in contact with said first and second electrodes to gases.

3. A cushion maintaining device as set forth in claim 2 wherein said means to convert current to said one electrode to pulsating direct current comprises:

a. an electrical conductor extending between the one electrode and the one terminal of the source of electrical current;

b. an electrical resistor in said electrical conductor; and c. a diode in said electrical conductor and positioned between said electrical resistor and said one electrode.

4. A cushion maintaining device as set forth in claim 1 wherein:

a. said first electrode is positioned within said chamber and depends from the closed upper end thereof; and b. said second electrode is formed on an interior surface of certain of said body walls defining said chamber and in surrounding relation with said first electrode whereby flow of electrical current between said first and second electrodes converts water in said body chamber and in contact with said electrodes to gases.

5. A cushion maintaining device as set forth in claim 1 wherein:

a. said first electrode is formed on an interior surface of certain of said walls defining said chamber; and b. said second electrode is formed on an interior surface of certain of said walls defining said chamber and positioned in close proximity to said first electrode whereby flow of electrical current between said first and second electrodes converts water in said body chamber and in contact with said electrodes to gas is.

6. A cushion maintaining device as set forth in claim 1 wherein:

a. said walls defining said chamber include at least one portion having a water engaging surface formed of a material which is a conductor of electricity;

b. said electrically conductive portion of said walls is formed of a material substantially inert to oxygen gas and hydrogen gas;

c. the source of electrical current has a first terminal and a second terminal;

d. one of said first and second terminals of the source of electrical current is electrically connected to said electrically conductive portion of said body walls whereby said electrically conductive portion of said body walls defines said second electrode; and e. said first electrode is positioned within said chamber and depends from the closed upper end thereof whereby said second electrode surrounds said first electrode.

7. A cushion maintaining device as set forth in claim 6 wherein a tubular member formed of a material which is a non-conductor of electricity receives the lower end of said body chamber and is mounted on a water service line whereby said body walls are electrically insulated from the water service line.

8. A cushion maintaining device for water service lines said device comprising:

a. an elongated tubular body having a side wall and an upper end and a lower end defining a chamber therein and means for closing the upper end and means for mounting the lower end on a water service line to provide communication between said chamber and the water service line, said body extending upwardly from a generally horizontal portion of a water service line whereby water under pressure will enter the lower portion of said chamber and rise to a level compressing trapped gas thereabove to a pressure equalling the water pressure;

b. means within said chamber for defining positive and negative electrodes positioned in spaced apart relation, said electrodes each having portions positioned intermediate the ends of said chamber and positioned to be engaged by water entering said chamber from the water service line when the water rises to a predetermined level therein;

c. means mounted on said body and defining an electrical circuit and connecting each of positive and negative terminals of a source of electrical current to a respective one of said positive and negative electrodes with the water in the chamber completing the circuit when contacting said electrodes and interrupting the circuit when the water level is lowered below at least one of said electrodes; and d. means electrically connected to the positive terminal of the source of electrical current and to said positive electrode and responsive to the completed circuit to convert current to said positive electrode to pulsating direct current to thereby convert water in said body chamber and in contact with said positive and negative electrodes to gases.

9. A cushion maintaining device as set forth in claim 8 wherein:
   a. said positive electrode is positioned within said chamber and depends from the closed upper end;
   b. said positive electrode is spaced from said side walls;
   c. said negative electrode is formed on an interior surface of said side wall of said body and positioned in surrounding relation with said positive electrode whereby flow of electrical current between said positive and negative electrodes converts water in said body chamber and in contact with said positive and negative electrodes to gases; and
   d. said means on the lower end of said body for mounting same on a water service line comprises a tubular member formed of a material which is a non-conductor of electricity whereby said body is electrically insulated from the water service line.

10. A cushion maintaining device as set forth in claim 8 wherein:
    a. said positive electrode is formed on an interior surface of said side wall of said body;
    b. said negative electrode is formed on an interior surface of said side wall of said body and positioned in close proximity to said positive electrode whereby flow of electrical current between said positive and negative electrodes converts water in said body chamber and in contact with said positive and negative electrodes to gases; and
    c. said means on the lower end of said body for mounting same on a water service line comprises a tubular member formed of a material which is a non-conductor of electricity whereby said body is electrically insulted from the water service line.

* * * * *